US012568334B2

(12) United States Patent
Zhang

(10) Patent No.: US 12,568,334 B2
(45) Date of Patent: Mar. 3, 2026

(54) SPEAKER

(71) Applicant: AAC Microtech (Changzhou) Co., Ltd., Changzhou (CN)

(72) Inventor: Chao Zhang, Changzhou (CN)

(73) Assignee: AAC Microtech (Changzhou) Co., Ltd., Changzhou (CN)

( * ) Notice: Subject to any disclaimer, the term of this patent is extended or adjusted under 35 U.S.C. 154(b) by 165 days.

(21) Appl. No.: 18/533,095

(22) Filed: Dec. 7, 2023

(65) Prior Publication Data

US 2024/0406633 A1 Dec. 5, 2024

Related U.S. Application Data

(63) Continuation of application No. PCT/CN2023/097401, filed on May 31, 2023.

(51) Int. Cl.
*H04R 7/04* (2006.01)
*H04R 1/44* (2006.01)
*H04R 9/06* (2006.01)

(52) U.S. Cl.
CPC ................. *H04R 7/04* (2013.01); *H04R 1/44* (2013.01); *H04R 9/06* (2013.01)

(58) Field of Classification Search
CPC ............... H04R 7/04; H04R 1/44; H04R 9/06
See application file for complete search history.

(56) References Cited

U.S. PATENT DOCUMENTS

2020/0045453 A1* 2/2020 Xiao ........................ H04R 9/06

FOREIGN PATENT DOCUMENTS

CN 103209376 B * 11/2015

* cited by examiner

*Primary Examiner* — Sunita Joshi
(74) *Attorney, Agent, or Firm* — Wiersch Law Group

(57) ABSTRACT

A speaker is disclosed. The speaker includes a vibration system, a magnetic circuit system, and a frame for fixing the vibration system and the magnetic circuit system. The vibration system includes a diaphragm and a voice coil driving the diaphragm for vibrating and sounding. The diaphragm includes a dome and a suspension surrounding the dome, and the dome and the suspension are integrally formed. The dome is provided with a positioning through hole for ensuring the concentricity of the dome and the suspension when integrally forming the dome and the suspension. The speaker ensures the concentricity of the dome and the suspension and improves the reliability of the diaphragm.

8 Claims, 3 Drawing Sheets

A-A

SPEAKER

FIELD OF THE PRESENT DISCLOSURE

The present disclosure relates to electroacoustic transducers, in particular to a speaker.

DESCRIPTION OF THE RELATED ART

A speaker in the related art includes a frame, and a vibration system and a magnetic circuit system fixed to the frame. The vibration system includes a diaphragm and a voice coil driving the diaphragm for vibrating and sounding. The diaphragm includes a dome and a suspension surrounding the dome, and the dome and the suspension are glued together.

However, when gluing the dome and the suspension together, the concentricity of the dome and the suspension cannot be ensured, resulting in imbalance vibrations when the diaphragm working. In addition, the glue is prone to overflow or be short when gluing, resulting in a poor reliability of the diaphragm of the speaker.

Thus, it is necessary to provide a novel speaker to solve the problems.

SUMMARY

An objective of the present disclosure is to overcome the above technical problems and provide a speaker which ensures the concentricity of the dome and the suspension and improves the reliability of the diaphragm.

In order to achieve the objective mentioned above, the present disclosure discloses a speaker including a vibration system, a magnetic circuit system, and a frame for fixing the vibration system and the magnetic circuit system. The vibration system includes a diaphragm and a voice coil driving the diaphragm for vibrating and sounding. The diaphragm includes a dome and a suspension surrounding the dome, and the dome and the suspension are integrally formed. The dome is provided with a positioning through hole for ensuring the concentricity of the dome and the suspension when integrally forming the dome and the suspension.

As an improvement, an amount of the positioning through holes is at least two.

As an improvement, an amount of the positioning through holes is two, a line connecting the two positioning through holes coincides with a symmetry axis of the diaphragm.

As an improvement, the dome is further provided with a sealant sealing the positioning through hole.

As an improvement, the diaphragm further includes a waterproof and air-permeable film attached to the dome, the waterproof and air-permeable film covers the positioning through hole.

As an improvement, the dome is further provided with a depression part, the positioning through hole is arranged at the depression part, the waterproof and air-permeable film is contained in the depression part.

As an improvement, the dome and the suspension are integrally formed by injection molding or hot pressing.

As an improvement, the magnetic circuit system includes a lower plate, a main magnet fixed to the lower plate, a plurality of auxiliary magnets fixed to the lower plate and spaced apart from the main magnet, a main yoke fixed to the main magnet, and a ring auxiliary yoke fixed to the plurality of auxiliary magnets, an amount of the plurality of auxiliary magnets is four, the four auxiliary magnets are respectively arranged at four sides of the main magnet, a first gap is formed between the adjacent two auxiliary magnets, and the ring auxiliary yoke is provided with a second gap corresponding to the first gap.

As an improvement, the vibration system further includes a flexible circuit board connected between the frame and the voice coil, the flexible circuit board is arranged at the first gap and the second gap.

As an improvement, the speaker further includes a mesh enclosure sleeved on the magnetic circuit system and arranged at a bottom of the speaker.

In the speaker according to the present disclosure, the dome and the suspension are integrally formed, thereby avoiding the technical problem of the poor reliability of the diaphragm caused by the overflowed glue or the glue shortage when gluing the dome and the suspension together, and improving the reliability of the diaphragm. In addition, the dome is provided with the positioning through hole for ensuring the concentricity of the dome and the suspension when integrally forming the dome and the suspension, the concentricity of the dome and the suspension can be ensured by the positioning through hole, thereby avoiding the technical problem of imbalance vibrations when the diaphragm working.

BRIEF DESCRIPTION OF THE DRAWINGS

In order to more clearly illustrate the technical solutions in embodiments of the present disclosure, the accompanying drawings used in the description of the embodiments will be briefly introduced below. It is apparent that, the accompanying drawings in the following description are only some embodiments of the present disclosure, and other drawings can be obtained by those of ordinary skill in the art based on the accompanying drawings without creative efforts, wherein.

DETAILED DESCRIPTION OF THE EMBODIMENTS

The technical solutions in embodiments of the present disclosure will be described clearly and completely below with reference to the accompanying drawings in the embodiments of the present disclosure. It is apparent that, the described embodiments are merely some of rather than all of the embodiments of the present disclosure. All other embodiments acquired by those of ordinary skill in the art without creative efforts based on the embodiments of the present disclosure shall fall within the protection scope of the present disclosure.

Figure 1:
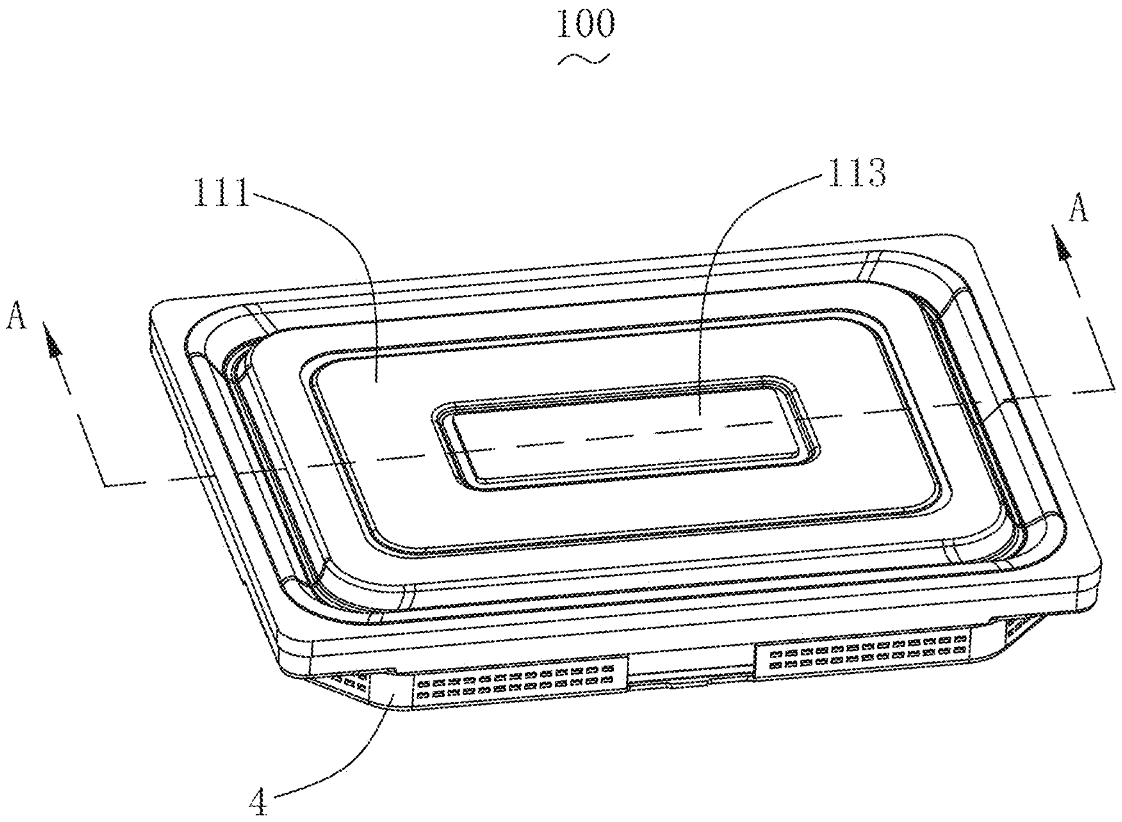
FIG. 1 is an isometric view of a speaker in accordance with an exemplary embodiment of the present disclosure.
Figure 2:
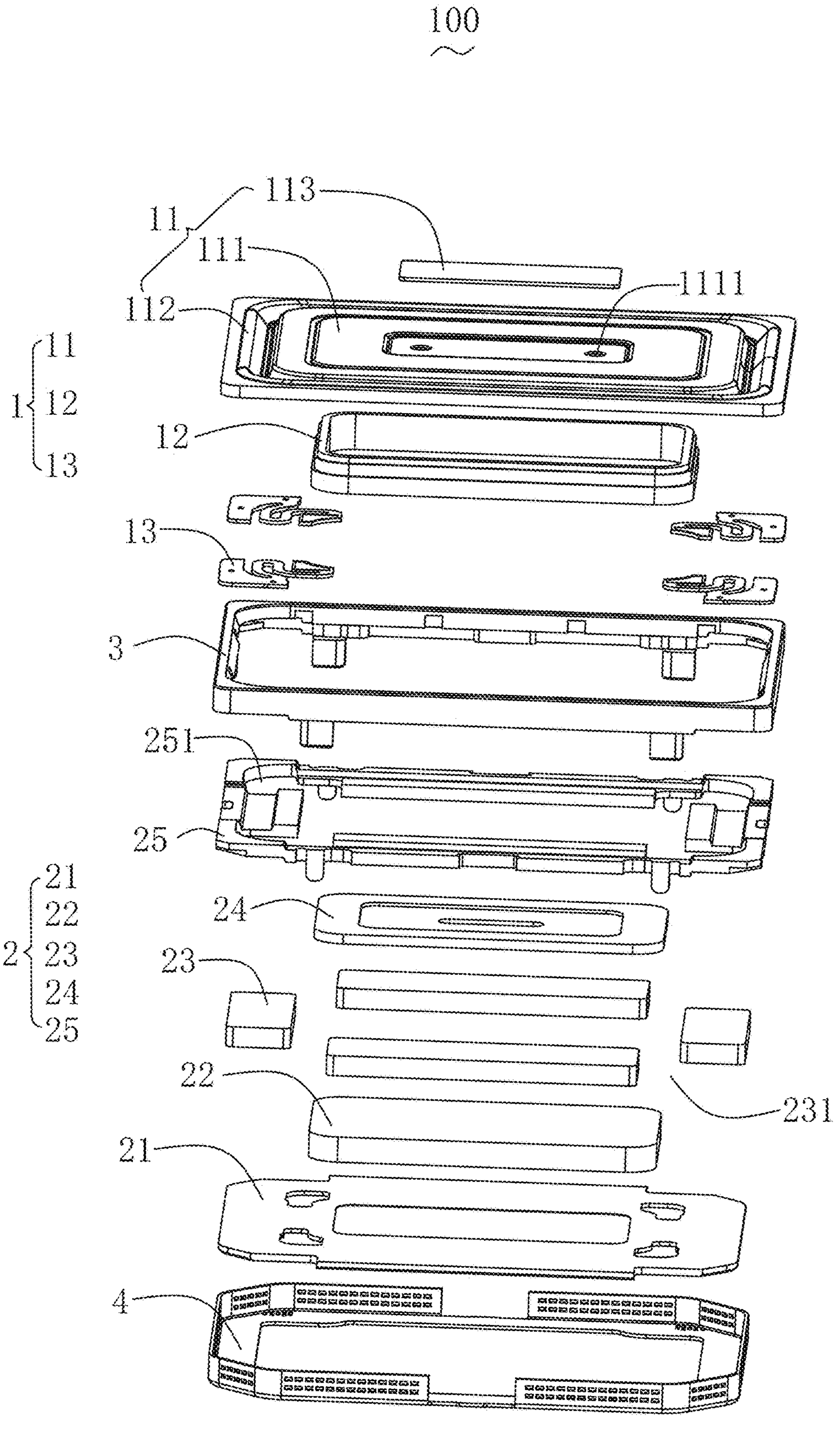
FIG. 2 is an exploded view of the speaker in FIG. 1.
Figure 3:
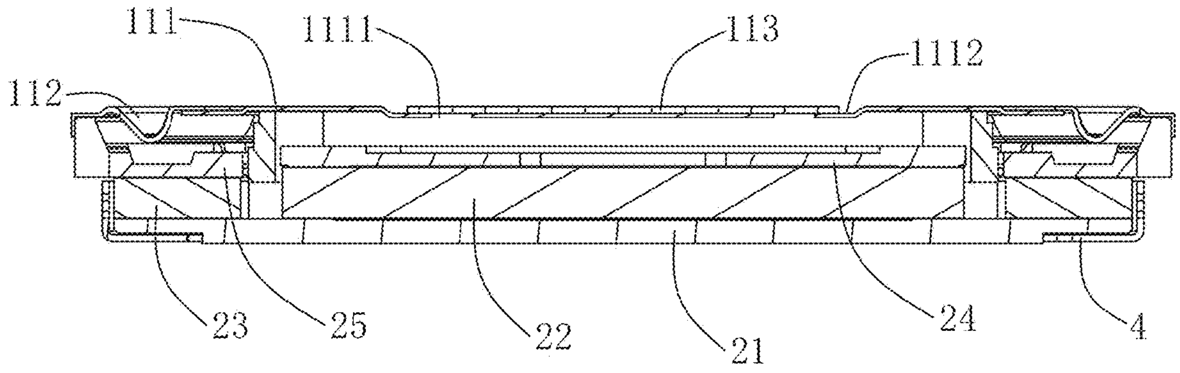
FIG. 3 is a cross-sectional view of the speaker, taken along line A-A in FIG. 1.

Referring to FIGS. 1-3, the present disclosure discloses a speaker 100 including a vibration system 1, a magnetic circuit system 2, and a frame 3 for fixing the vibration system 1 and the magnetic circuit system 2.

The vibration system 1 includes a diaphragm 11 and a voice coil 12 driving the diaphragm 11 for vibrating and sounding. The diaphragm 11 includes a dome 111 and a suspension 112 surrounding the dome 111.

The dome 111 and the suspension 112 are integrally formed. Optionally, the dome 111 and the suspension 112 are integrally formed by injection molding or hot pressing.

The dome 111 is provided with a positioning through hole 1111 for ensuring the concentricity of the dome 111 and the suspension 112 when integrally forming the dome 111 and the suspension 112. The positioning through hole 1111 may cooperate with a positioning mechanism of a tool for positioning the relative position of the dome 111 and the suspension 112, thereby ensuring the concentricity of the dome 111 and the suspension 112.

Optionally, an amount of the positioning through holes 1111 is at least two, the at least two positioning through holes 1111 can easily avoid the rotation of the dome 111 when positioning, and the positioning method is simple and more effective. It is noted that only one positioning through hole 1111 is also feasible, for example, some methods of changing the shape of the positioning through-hole 1111, or choosing the position of the positioning through-hole 1111, as long as any method for positioning the relative position of the dome 111 and the suspension 112.

In this embodiment, an amount of the positioning through holes 1111 is two, a line connecting the two positioning through holes 1111 coincides with a symmetry axis of the diaphragm 11.

The magnetic circuit system 2 includes a lower plate 21, a main magnet 22 fixed to the lower plate 21, a plurality of auxiliary magnets 23 fixed to the lower plate 21 and spaced apart from the main magnet 22, a main yoke 24 fixed to the main magnet 22, and a ring auxiliary yoke 25 fixed to the plurality of auxiliary magnets 23. An amount of the plurality of auxiliary magnets 23 is four, the four auxiliary magnets 23 are respectively arranged at four sides of the main magnet 22. A first gap 231 is formed between the adjacent two auxiliary magnets 23, and the ring auxiliary yoke 25 is provided with a second gap 251 corresponding to the first gap 231.

The vibration system 1 further includes a flexible circuit board 13 connected between the frame 3 and the voice coil 12, the flexible circuit board 13 is arranged at the first gap 231 and the second gap 251.

The speaker 100 further includes a mesh enclosure 4 sleeved on the magnetic circuit system and arranged at a bottom of the speaker 100, the mesh enclosure 4 can prevent foreign matters from entering an interior of the speaker 100.

Since the positioning through hole 1111 communicates both sides of the diaphragm 11, it is necessary to deal with the positioning through hole 1111.

In this embodiment, the diaphragm 11 further includes a waterproof and air-permeable film 113 attached to the dome 111, the waterproof and air-permeable film 113 covers the positioning through hole 1111, thereby achieving the effects of the waterproofness, the air permeability, adjusting the damping at the positioning through hole 1111, and balancing the air pressure.

Optionally, the dome 111 is further provided with a depression part 1112, the positioning through hole 1111 is arranged at the depression part 1112, the waterproof and air-permeable film 113 is contained in the depression part 1112.

Figure 4:
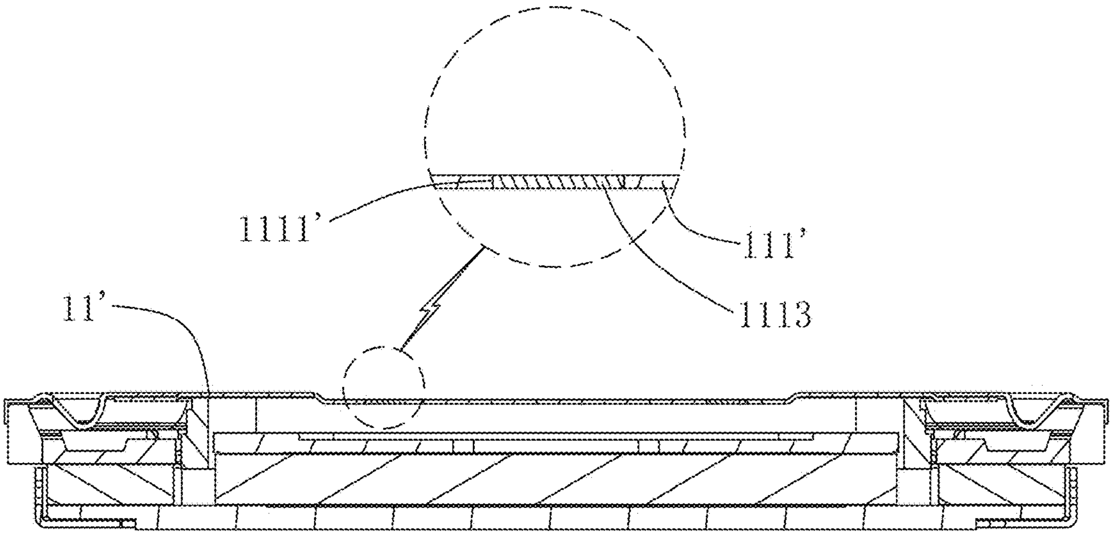
FIG. 4 is a cross-sectional view of another speaker of the present disclosure.

In another embodiment, referring to FIG. 4, the dome 111' is further provided with a sealant 1113 sealing the positioning through hole 1111', the sealant 1113 can separate the two sides of the diaphragm 11'.

In the speaker according to the present disclosure, the dome and the suspension are integrally formed, thereby avoiding the technical problem of the poor reliability of the diaphragm caused by the overflowed glue or the glue shortage when gluing the dome and the suspension together, and improving the reliability of the diaphragm. In addition, the dome is provided with the positioning through hole for ensuring the concentricity of the dome and the suspension when integrally forming the dome and the suspension, the concentricity of the dome and the suspension can be ensured by the positioning through hole, thereby avoiding the technical problem of imbalance vibrations when the diaphragm working.

The above are only embodiments of the present disclosure. It should be pointed out that those of ordinary skill in the art may also make improvements without departing from the ideas of the present disclosure, all of which fall within the protection scope of the present disclosure.

What is claimed is:

1. A speaker, comprising:

a vibration system, comprising a diaphragm and a voice coil driving the diaphragm for vibrating and sounding;

a magnetic circuit system; and a frame for fixing the vibration system and the magnetic circuit system;

wherein the diaphragm comprises a dome and a suspension surrounding the dome, the dome and the suspension are integrally formed, the dome is provided with a positioning through hole for ensuring the concentricity of the dome and the suspension when integrally forming the dome and the suspension, the diaphragm further comprises a waterproof and air-permeable film attached to the dome, the waterproof and air-permeable film covers the positioning through hole.

2. The speaker as described in claim 1, wherein an amount of the positioning through holes is at least two.

3. The speaker as described in claim 2, wherein an amount of the positioning through holes is two, a line connecting the two positioning through holes coincides with a symmetry axis of the diaphragm.

4. The speaker as described in claim 1, wherein the dome is further provided with a depression part, the positioning through hole is arranged at the depression part, the waterproof and air-permeable film is contained in the depression part.

5. The speaker as described in claim 1, wherein the dome and the suspension are integrally formed by injection molding or hot pressing.

6. The speaker as described in claim 1, wherein the magnetic circuit system comprises a lower plate, a main magnet fixed to the lower plate, a plurality of auxiliary magnets fixed to the lower plate and spaced apart from the main magnet, a main yoke fixed to the main magnet, and a ring auxiliary yoke fixed to the plurality of auxiliary magnets, an amount of the plurality of auxiliary magnets is four, the four auxiliary magnets are respectively arranged at four sides of the main magnet, a first gap is formed between the adjacent two auxiliary magnets, and the ring auxiliary yoke is provided with a second gap corresponding to the first gap.

7. The speaker as described in claim 6, wherein the vibration system further comprises a flexible circuit board connected between the frame and the voice coil, the flexible circuit board is arranged at the first gap and the second gap.

8. The speaker as described in claim 6, further comprising a mesh enclosure sleeved on the magnetic circuit system and arranged at a bottom of the speaker.

* * * * *